Patented Oct. 8, 1935

2,016,986

UNITED STATES PATENT OFFICE 2,016,986

PLASTER AND THE LIKE

Gerald Otley Case, Sevenoaks, England, assignor, by mesne assignments, to Carbo Plaster Limited, Westminster, England No Drawing. Application August 13, 1932, Serial No. 628,769. In Great Britain August 18, 1931

2 Claims. (Cl. 106—24)

This invention relates to plasters, mortars and the like.

The main feature of the present invention is to provide a cementitious mixture which is ready for use.

A further object is to provide a mixture which is in a dry condition and easy to handle and to which it is merely necessary to add the gauging water to have the material in a usable condition.

Another object is to provide a dry cementitious mixture ready for use which can be mixed with sand or other fine aggregate or even fibrous materials for making mortar, plastering undercoats, or finishing coats, or a material which can be used neat as a finishing coat.

A still further object is to provide a dry cementitious material, which is ready for use and which can be used neat or with an aggregate to form mouldings, partition blocks or the like.

According to the present invention a ready-for-use cementitious mixture in the form of a fine dry powder includes a dry calcium carbonate or limestone, or dolomite, of a fineness to pass through a sieve having 50 meshes per linear inch, but not so fine that all passes through a 200 mesh sieve and a dry calcium hydrate or calcium magnesium hydrate in the proportions of about 4 to 1 by weight of carbonate to hydrate. This cementitious mixture is preferably bagged as soon as it is made to prevent atmospheric air initiating setting in the mixture. By dry hydrate is meant a hydrate formed by adding to the oxide only sufficient water to chemically combine with the oxide; the material is a dry powder. Mechanically hydrated lime is a dry hydrate and a common article of commerce. Accordingly, the term "dry hydrate" excludes a hydrate formed by slaking the oxide in the ordinary way with water to form a lime putty, whether the resultant material is dried or not. When once the hydrate has been so slaked, a hydrate physically different from the hydrate used in carrying out the invention is obtained and which is quite unsuitable for the manufacture of a cementitious material intended for plasters, mortars, or the like.

The carbonate used according to the invention is one in which the water content has been positively driven out. This may be effected by heating in a kiln, but not above 600° C., at which temperature $CO_2$ would be driven off, or by passing over ground carbonate material a hot air stream.

The dry carbonate used in carrying out this invention is ground to a fineness such that the material passes a sieve having 50 meshes per linear inch, but of sufficient coarseness to be suitable for forming a plaster as hereafter explained.

Conveniently the dry carbonate used in accordance with the invention is produced by grinding limestone in a mill to the desired fineness; it is found that the heat generated in grinding is sufficient to dry the material at the same time.

The dry fine carbonate is then mechanically mixed with the powdery dry hydrate in the proportions of about 80% (75%–85%) by weight of carbonate to 20% (15%–30%) by weight of hydrate, and then when the mixture is considered intimate enough the cementitious material so formed is immediately bagged, e. g. in what is known as three ply paper bags, which exclude the atmosphere. This mixture is ready for use, gauging water only has to be added to obtain a setting mixture.

It will be understood that by grinding the carbonate so that all the particles pass a sieve having 50 meshes per linear inch, the particles will in practice be graded, some being relatively coarse and some relatively fine. Although from the chemical point of view a plaster which will set may be obtained by using carbonate ground to any degree of fineness as long as the particles all pass a 50 mesh sieve, in practice the fineness of the particles is limited by the fact which is well known in the art, that if the degree of fineness is too great, the plaster is difficult to apply. Consequently, in practice, although all the particles pass a 50 mesh sieve, they must be coarse enough to render the plaster capable of being readily applied to a surface, but not so fine as to pass wholly through a 200 sieve. The fineness varies according to the material. If the carbonate is chalk which is relatively soft and easily crushed by a builder's trowel, a more coarse size, 50 mesh, is employed, whereas if the carbonate material is hard limestone which cannot be easily crushed with a trowel, then it is crushed mechanically to pass through a 100 sieve in order to form a constituent part of a cementitious material according to the invention. Too fine a material is completely unsuitable for plastering and the 200 sieve grade is about the limit of fineness.

Preferably from 5% to 15% by weight of the mixture of plaster of Paris is added to the mixture specified above. When this plaster of Paris is added not only is a stronger plaster obtained, but also the material sets more rapidly. When 15% of plaster of Paris is added a very quick setting plaster is formed.

The invention is not limited to the employment of calcium hydroxide and calcium carbonate or limestone, but covers also the employment of dry calcium magnesium hydroxide and dry dolomite which latter is partly calcium carbonate and partly magnesium carbonate with small amount of impurities.

In order that the invention may be clearly understood, its application to the production of plaster from limestone and dry calcium hydroxide will be described. 20% of finely powdered dry mechanically hydrated lime is intimately mixed by machinery, with 80% of limestone, previously ground in a mill to pass a sieve having fifty meshes per linear inch.

It should be noted that the materials must be intimately mixed and that as such intimate mixture cannot be obtained by manual means, it is essential in practice to use a mechanical mixer which may be of any known form.

When used for mortar making the dry powdered plaster made according to this invention is mixed with three or four parts of sand or other fine aggregate, e. g. granulated limestone and water is then added in the usual way.

For plastering neat the ready-to-use dry powder is mixed with water in the usual way and applied to walls or the like.

For making partition slabs, mouldings, etc., the dry powder and, when desired, aggregate is mixed with water and the wet mixture filled into moulds. If an aggregate such as sand is used it is thoroughly mixed with the dry powder before adding the water.

The plaster according to this invention is cheaper to manufacture than lime or gypsum plasters as in the manufacture of these plasters all the raw materials have to be calcined, whereas in making plaster according to this invention a large proportion of uncalcined material is used, i. e. calcium carbonate, limestone or dolomite.

Plasters made according to this invention are superior to lime plasters as they are harder and stronger and are equal in quality to the finest grade of gypsum plasters.

If in the manufacture of cementitious mixtures according to the invention chalk is used as the carbonate constituent, the chalk must be specially treated to obtain a dry and fine form required according to the invention.

Ground chalk in the ordinary way, though referred to as dry, does contain a considerable amount of moisture. It is essential therefore, in the employment of chalk that the grinding is effected whilst the chalk is hot, thereby a dry fine substance obtains.

What I claim is:

1. A ready-for-use cementitious mixture in the form of a dry powder including calcium carbonate dried by heating but not above 600° C. and of a fineness to pass through a sieve having 50 meshes per linear inch, but not so fine that all passes through a 200 mesh sieve, and calcium hydrate obtained by adding to the oxide from which the hydrate is formed only that amount of water content to chemically combine with the oxide in the proportions of about 4 to 1 by weight of carbonate to hydrate.

2. A ready-for-use cementitious mixture in the form of a dry powder including dry dolomite dried by heating without changing the carbonate to oxide of a fineness to pass through a sieve having 50 meshes per linear inch, but not so fine that all passes through a 200 mesh sieve and calcium magnesium hydrate obtained by adding to the oxide from which the hydrate is formed only that amount of water content to chemically combine with the oxide in the proportions of about 4 to 1 by weight of carbonate to hydrate.

GERALD OTLEY CASE.